US010102398B2

(12) United States Patent
Neergaard

(10) Patent No.: US 10,102,398 B2
(45) Date of Patent: Oct. 16, 2018

(54) GENERATING OBFUSCATED DATA

(75) Inventor: Peter Neergaard, Somerville, MA (US)

(73) Assignee: Ab Initio Technology LLC, Lexington, MA (US)

( * ) Notice: Subject to any disclaimer, the term of this patent is extended or adjusted under 35 U.S.C. 154(b) by 396 days.

(21) Appl. No.: 12/497,354

(22) Filed: Jul. 2, 2009

(65) Prior Publication Data

US 2010/0306854 A1 Dec. 2, 2010

Related U.S. Application Data

(60) Provisional application No. 61/183,054, filed on Jun. 1, 2009.

(51) Int. Cl.
*G06Q 20/00* (2012.01)
*G06F 21/62* (2013.01)

(52) U.S. Cl.
CPC ................. *G06F 21/6254* (2013.01)

(58) Field of Classification Search
USPC ............................................. 705/50; 726/26
See application file for complete search history.

(56) References Cited

U.S. PATENT DOCUMENTS

| 5,664,187 | A | 9/1997 | Burkes et al. |
|---|---|---|---|
| 6,546,389 | B1 | 4/2003 | Agrawal et al. |
| 6,567,936 | B1 | 5/2003 | Yang |
| 6,581,058 | B1 | 6/2003 | Fayyad et al. |
| 6,643,648 | B1 * | 11/2003 | Ross et al. .................... 707/695 |
| 6,728,699 | B1 | 4/2004 | Lautzenheiser |
| 6,957,161 | B2 | 10/2005 | Allen et al. |
| 7,080,063 | B2 | 7/2006 | Campos |
| 7,085,981 | B2 | 8/2006 | Aggarwal |
| 7,194,317 | B2 | 3/2007 | Kothare et al. |
| 7,266,699 | B2 * | 9/2007 | Newman et al. ............. 713/182 |
| 7,334,466 | B1 | 2/2008 | Brislin |
| 7,849,075 | B2 | 12/2010 | Gould et al. |

(Continued)

FOREIGN PATENT DOCUMENTS

| CN | 1495584 | 5/2004 |
|---|---|---|
| DE | 19911176 | 9/2000 |

(Continued)

OTHER PUBLICATIONS

Black, John, et al., "Ciphers with Arbitrary Finite Domains," Source Lecture Notes in Computer Science; vol. 2271 archive, Proceedings of the The Cryptographer's Track at the RSA Conference on Topics in Cryptology table of contents, 2002, pp. 114-130.

(Continued)

*Primary Examiner* — John W Hayes
*Assistant Examiner* — John M Winter
(74) *Attorney, Agent, or Firm* — Fish & Richardson P.C.

(57) ABSTRACT

A method for obfuscating data includes: reading values occurring in one or more fields of multiple records from a data source; storing a key value; for each of multiple of the records, generating an obfuscated value to replace an original value in a given field of the record using the key value such that the obfuscated value depends on the key value and is deterministically related to the original value; and storing the collection of obfuscated data including records that include obfuscated values in a data storage system.

60 Claims, 7 Drawing Sheets

(56) References Cited

U.S. PATENT DOCUMENTS

| | | | |
|---|---|---|---|
| 8,069,129 | B2 | 11/2011 | Gould |
| 8,117,221 | B2* | 2/2012 | Elteto et al. ............ 707/757 |
| 8,209,549 | B1 | 6/2012 | Bain, III |
| 9,002,770 | B2 | 4/2015 | Gould |
| 2002/0138492 | A1 | 9/2002 | Kil |
| 2004/0107189 | A1 | 6/2004 | Burdick |
| 2005/0114369 | A1 | 5/2005 | Gould et al. |
| 2005/0240862 | A1 | 10/2005 | Palmer |
| 2005/0288910 | A1 | 12/2005 | Schlessinger et al. |
| 2006/0179075 | A1* | 8/2006 | Fay ............................ 707/102 |
| 2006/0242610 | A1 | 10/2006 | Aggarwal |
| 2007/0106666 | A1 | 5/2007 | Beckerele |
| 2007/0174030 | A1 | 7/2007 | Sung-Hee et al. |
| 2007/0199074 | A1 | 8/2007 | Levine et al. |
| 2007/0256061 | A1 | 11/2007 | Victorov |
| 2008/0033960 | A1* | 2/2008 | Banks ............... G06F 17/30595 |
| 2008/0118150 | A1 | 5/2008 | Balakrishnan et al. |
| 2009/0122676 | A1 | 5/2009 | Tanizawa |
| 2009/0132575 | A1 | 5/2009 | Kroeschel et al. |
| 2009/0254514 | A1* | 10/2009 | Adair ............... G06F 17/30448 |
| 2010/0318481 | A1 | 12/2010 | Feynman |
| 2011/0153575 | A1 | 6/2011 | Glasser |
| 2011/0179011 | A1* | 7/2011 | Cardno et al. ............... 707/709 |
| 2012/0030165 | A1* | 2/2012 | Guirguis et al. ............ 707/607 |
| 2012/0197887 | A1 | 8/2012 | Anderson |
| 2014/0222752 | A1 | 8/2014 | Isman |
| 2015/0169428 | A1 | 6/2015 | Isman |

FOREIGN PATENT DOCUMENTS

| | | |
|---|---|---|
| JP | 10-030943 | 2/1998 |
| JP | 2001-256076 | 9/2001 |
| JP | 2006-163831 | 6/2006 |
| JP | 2006-221647 | 8/2006 |
| JP | 2006-236220 | 9/2006 |
| JP | 2009-110179 | 5/2009 |
| WO | WO2002/084531 | 10/2002 |
| WO | 2008/124319 | 10/2008 |

OTHER PUBLICATIONS

International Search Report & Written Opinion issued in PCT application No. PCT/US10/38018, dated Aug. 23, 2010, 10 pages.
Luby, Michael et al., "How to construct pseudorandom permutations from pseudorandom Functions," SIAM J. Comput. vol. 17 # 2, Apr. 1988, pp. 373-386.
Maurer, Ueli, "A simplified and generalized treatment of Luby-Rackoff pseudorandom permutation generators," in 'Advances in Cryptology—EUROCRYPT '92 (Lecture Notes in Computer Science)', Berlin: Springer Verlag, vol. 658, pp. 239-255, 1992.
Parameswaran, Rupa et al., "A Robust Data-obfuscation Approach for Privacy Preservation of Clustered Data," Proceedings of the Workshop on Privacy and Security Aspects of Data Mining, pp. 18-25, 2005.
Japanese Office Action, with English Translation, JP application No. 2012-514029, dated Mar. 27, 2014 (28 pages).
Chakraborty, Soubhik et al., "A Statistical Approach to Modeling Indian Classical Music Performance," Oct. 2008, Cornell University, 24 pgs.
"Data Sanitization Techniques," A Net 2000 Ltd. White Paper, Jan. 24, 2009, 10 pages.
Price, Huw, "A Short guide to Scrambling, Masking and Obfuscating Production Data," Grid-Tools Ltd., Feb. 6, 2009, pp. 1-17.
Supplementary European Search Report, EP10783895, dated Dec. 11, 2012, 5 pages.
Japanese Office Action, with English Translation, JP application No. 2012-515111, dated Feb. 18, 2014, 14 pages.
Kimura, Hirofumi, Easycap for Oracle: data base test data generation tool, Dr. Dobb's Journal Japan, Jan. 1, 1999, vol. 8, 1st Issue, p. 138-139.
Tanabe, Tsuneo, Easycap for Oracle Ver 1.0, Visual Basic magazine, Japan, Shoeisha, Mar. 1, 1999, vol. 5, 7th issue, p. 168-171.
Umeda, Hironori, Software Development Support Tool (System Integrator) for Oracle SI Object Browser Ver. 8.0, DB Magazine, Japan, Shoeisha, Jun. 1, 2003, vol. 13, 3rd issue, p. 241-245.
Chinese Office Action, with English translation, CN application No. 2010800354097, dated Nov. 21, 2013, 17 pages.
Bertino, Elisa et. al., "A Framework for Evaluating Privacy Preserving Data Mining Algorithms." Data Mining and Knowledge Discovery, 11, 121-154, 2005.
Lee, Joochang, et. al., "A Data Sanitization Method for Privacy Preserving Data Re-publication." IEEE, 2008, 4 pages.
Wang, En Tzu, et. al., "A Novel Method for Protecting Sensitive Knowledge in Association Rules Mining." IEEE, Annual International Computer Software and Application Conference (COMPSAC), 2005, 6 pages.
International Search Report & Written Opinion issued in PCT/US2014/070747, dated May 29, 2015.
Relative frequency table and histogram:StatWMich, 2003, Retrieved from the internet http://www.stat.wmich.edu/s216/book/node11.htm.
Korean Office Action in Application No. 10-2012-7000470, dated Dec. 11, 2015, 7 pages.
European Search Report in Application No. 107838955, dated May 12, 2016 (5 pages).
Korean Office Action in Application No. 10-2015-7008165, dated Feb. 17, 2016 (5 pages).
Canadian Office Action in Application No. 2,764,390, dated Apr. 4, 2016 (4 pages).
Australian Office Action in Application No. 2010256869, dated Dec. 10, 2015 (3 pages).
International Preliminary Report on Patentability issued in PCT/US2014/070747, dated Jun. 21, 2016.
Transaction History, U.S. Appl. No. 12/797,509, filed Jul. 10, 2013, 1 page.
Edgar, Dale, "Data Sanitization Techniques" [retrieved Aug. 1, 2013] Retrieved from the Internet <URL:http://www.orafaq.com/papers/data_sanitization.pdf>.
International Search Report & Written Opinion in PCT application No. PCT/US10/36812, dated Aug. 3, 2010, 8 pages.
Transaction History, U.S. Appl. No. 12/797,509.
An introduction to programming and problem solving with pascal :Schneider, 1982, Wiley.
European Office Action in European Application No. 10786779.6, dated May 23, 2017, 5 pages (with English translation).
Bakken D et al, "Data Obfuscation: Anonymity and Desensitization of Usable Data Sets", vol. 2, No. 6, IEEE, XP011123201, pp. 34-41 (2004).

* cited by examiner

| Index | Name |
|-------|------|
| 0 → 7 | Norton |
| 3 10  | Lee |
| 11    | Butler |

| All possible ID values, in sequence | Shuffled version of all possible ID values |
|---|---|
| 1 | 2 |
| 2 | 5 |
| 3 | 9 |
| 4 | 11 |
| 5 | 15 |
| 6 | 17 |
| 7 | 18 |
| 8 | 20 |
| 9 | 1 |
| 10 | 16 |
| 11 | 13 |
| 12 | 4 |
| 13 | 3 |
| 14 | 6 |
| 15 | 7 |
| 16 | 8 |
| 17 | 10 |
| 18 | 12 |
| 19 | 14 |
| 20 | 19 |

2 → 5 → 15 → 7 → 18

4 → 11 → 13 → 3 → 9 → 1 → 2

| All possible values, in sequence (only even numbers are valid) | Shuffled version of all possible ID values (result of encode_ssn) | Validated value (result of is_valid_ssn at end of while loop) |
|---|---|---|
| 1 | 2 | |
| 2 | 5 | 18 |
| 3 | 9 | |
| 4 | 11 | 2 |
| 5 | 15 | |
| 6 | 17 | 10 |
| 7 | 18 | |
| 8 | 20 | 20 |
| 9 | 1 | |
| 10 | 16 | 16 |
| 11 | 13 | |
| 12 | 4 | 4 |
| 13 | 3 | |
| 14 | 6 | 6 |
| 15 | 7 | |
| 16 | 8 | 8 |
| 17 | 10 | |
| 18 | 12 | 12 |
| 19 | 14 | |
| 20 | 19 | 14 |

FIG. 7

GENERATING OBFUSCATED DATA

CROSS-REFERENCE TO RELATED APPLICATIONS

This application claims priority to U.S. Application Ser. No. 61/183,054, filed on Jun. 1, 2009, incorporated herein by reference.

BACKGROUND

This description relates to generating obfuscated data.

In many companies, software developers work outside the production environment (e.g., an environment in which actual customer data is processed), and for security reasons they do not have access to production data. However, to ensure that their applications will run correctly with production data, they may need realistic test data during development and testing that exhibits certain characteristics of production data. To provide such realistic test data, a set of input production data can be obfuscated to ensure that no sensitive information is remains, and the obfuscated data can be stored for use as test data. The requirements imposed on obfuscated data may vary widely, depending on the needs of the project and the developers, the privacy policies of the organization, and even the laws of the country where it will be used. For example, data obfuscation may involve replacing or altering personal information such as name, address, date of birth, social security number, and credit card and bank account numbers.

SUMMARY

In one aspect, in general, a method for obfuscating data includes: reading values occurring in one or more fields of multiple records from a data source; storing a key value; for each of multiple of the records, generating an obfuscated value to replace an original value in a given field of the record using the key value such that the obfuscated value depends on the key value and is deterministically related to the original value; and storing the collection of obfuscated data including records that include obfuscated values in a data storage system.

Aspects can includes one or more of the following features.

The method further includes storing profile information including statistics characterizing values of at least one of the fields.

The obfuscated value is generated using the key value and the stored profile information for the given field.

The obfuscated value occurs in the given field of the collection of obfuscated data at a frequency determined based on statistics in the stored profile information characterizing values of the given field.

The obfuscated value is generated by using the original value and the key as inputs to a function that generates an index value and using the index value to look up the obfuscated value in a predetermined set of obfuscated values.

The predetermined set of obfuscated values is stored as a lookup table in which each obfuscated value corresponds to one or more index values.

Multiple index values within a range correspond to the same obfuscated value in the predetermined set of obfuscated values.

The size of the range is based on the statistics in the stored profile information characterizing values of the given field.

Generating an obfuscated value to replace an original value in a given field of the record using the key value includes combining the original value and the key using a deterministic function to yield a selection value used to select the obfuscated value.

The selection value is mapped to the obfuscated value using a deterministic mapping.

A domain of values from which the obfuscated value is selected includes multiple of the original values in the given field of the records from the data source.

One or more of the original values are not included in the domain of values.

One or more of the values in the domain of values are not included in the original values.

The deterministic function cryptographically prevents recovery of the original value from the obfuscated value using the key.

The deterministic function provides a different sequences of selection values versus consecutive original values for different values of they key.

A first sequence of selection values for consecutive original values for a first value of they key is not predictable from a second sequences of selection values for consecutive original values for a second value of the key.

Generating the obfuscated value to replace the original value in the given field of the record using the key value includes determining whether the selection value corresponds to a valid obfuscated value, and if not repeatedly combining the selection value and the key using the deterministic function to yield an additional selection value until the additional selection value corresponds to a valid obfuscated value.

A valid obfuscated value consists of a predetermined number of digits.

The method further includes partitioning the records from the data source into multiple sets of records and replacing the original values in the given field with the generated obfuscated values in records of different sets of records in parallel using different computing resources.

At least a first record that includes an obfuscated value in the collection of obfuscated data includes at least one original value that was not replaced with an obfuscated value.

The method further includes determining whether an original value in the first record is to be replaced with an obfuscated value using the key value based on whether the original value is to be replaced with the same obfuscated value consistently for multiple records in which the original value occurs.

In another aspect, in general, a system for obfuscating data includes: a data source providing records having values in one or more fields; a data storage system; and one or more processors coupled to the data storage system. The one or more processors provide an execution environment to: read values occurring in one or more fields of multiple records from the data source; store a key value; for each of multiple of the records, generate an obfuscated value to replace an original value in a given field of the record using the key value such that the obfuscated value depends on the key value and is deterministically related to the original value; and store the collection of obfuscated data including records that include obfuscated values in the data storage system.

In another aspect, in general, a system for obfuscating data includes: a data source providing records having values in one or more fields; a data storage system; and means for reading values occurring in one or more fields of multiple records from the data source; means for generating, for each of multiple of the records, an obfuscated value to replace an original value in a given field of the record using the key value such that the obfuscated value depends on the key value and is deterministically related to the original value; and means for storing the collection of obfuscated data including records that include obfuscated values in the data storage system.

In another aspect, in general, a computer-readable medium stores a computer program for obfuscating data. The computer program includes instructions for causing a computer to: read values occurring in one or more fields of multiple records from a data source; store a key value; for each of multiple of the records, generate an obfuscated value to replace an original value in a given field of the record using the key value such that the obfuscated value depends on the key value and is deterministically related to the original value; and store the collection of obfuscated data including records that include obfuscated values in a data storage system.

Aspects can have one or more of the following advantages.

Since there is a deterministic relationship between an obfuscated value and the original actual value, referential integrity can be preserved during the obfuscation process so that the obfuscated data meets the same referential integrity constraints as the production data. The obfuscation process can also ensure that certain operations performed on the obfuscated data preserve certain characteristics, such as the number of values per key in a "join" operation. Since the deterministic relationship between a given obfuscated value and a corresponding original value is a function of a stored key value and does not depend on other obfuscated values, the obfuscation can be performed in parallel on different portions of a dataset while still preserving relationships among those portions. The obfuscation process can prevent unauthorized parties from reverse engineering the obfuscated data and retrieving the original values from the production data. Characteristics such as the record formats, ranges of possible values, statistical characteristics, and general profile of the obfuscated data can match the original data as closely as possible. For example, since credit-card numbers use check digits, the obfuscated data may also have correctly calculated values for the check digits. If the original data has misspellings and inconsistencies, the obfuscated data can have the same or similar kinds of irregularities to test error handling. For values such as names (e.g., first and last) and addresses, the frequency of specific values in the obfuscated data can reflect their frequency in the production data.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 is an exemplary lookup table.

FIG. 6 is a table with a pseudorandom permutation example.

FIG. 7 is a table with an example of a procedure for generating valid obfuscated values.

DETAILED DESCRIPTION

Figure 1:
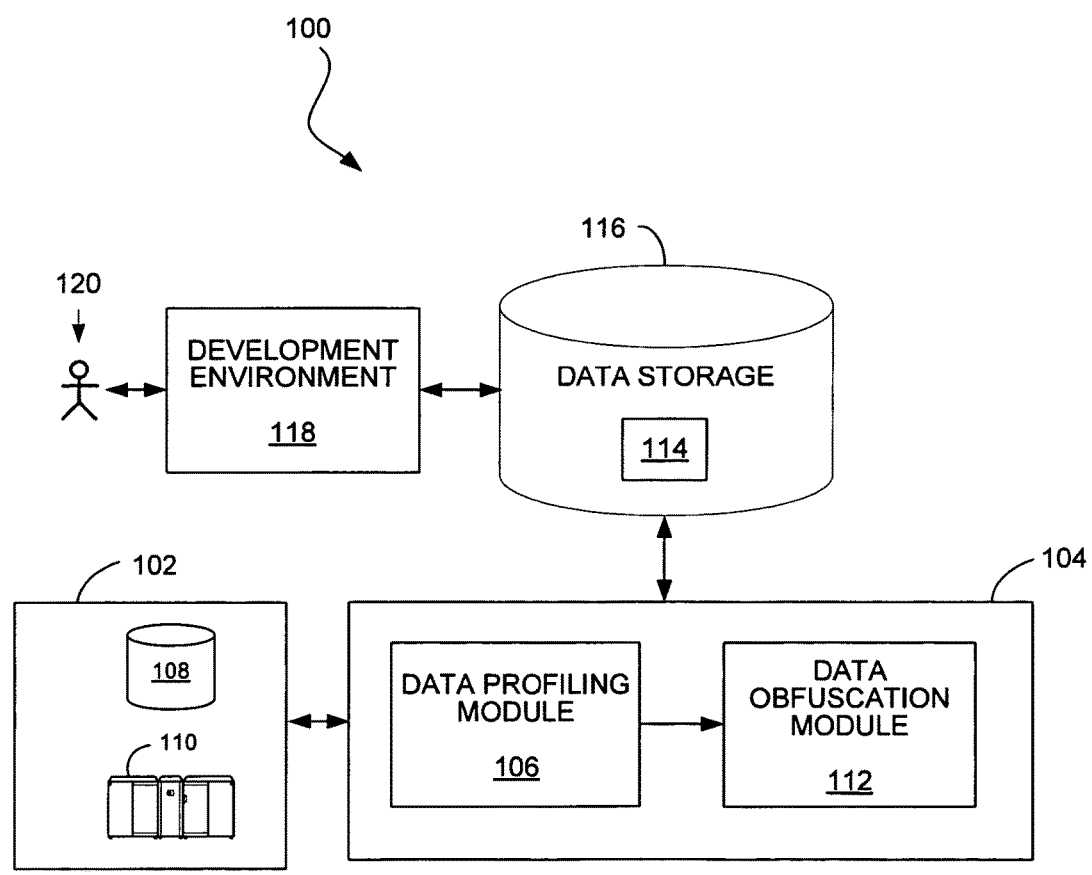
FIG. 1 is a block diagram of a system for executing graph-based computations.

Referring to FIG. 1, a system 100 for using obfuscated data to develop programs includes a data source 102 that may include one or more sources of data such as storage devices or connections to online data streams, each of which may store data in any of a variety of storage formats (e.g., database tables, spreadsheet files, flat text files, or a native format used by a mainframe). An execution environment 104 for generating obfuscated data includes a data profiling module 106 and a data obfuscation module 112. The execution environment 104 may be hosted on one or more general-purpose computers under the control of a suitable operating system, such as the UNIX operating system. For example, the execution environment 108 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via LAN or WAN networks), or any combination thereof.

The data profiling module 106 reads data from the data source 102 and stores profile information describing various characteristics of the data values that occur in the data source 102. Storage devices providing the data source 102 may be local to the execution environment 104, for example, being stored on a storage medium connected to a computer running the execution environment 104 (e.g., hard drive 108), or may be remote to the execution environment 104, for example, being hosted on a remote system (e.g., mainframe 110) in communication with a computer running the execution environment 104 over a local or wide area data network.

The data obfuscation module 112 uses the profile information generated by the data profiling module 106 to generate a collection of obfuscated data 114 stored in a data storage system 116 accessible to the execution environment 104. The data storage system 116 is also accessible to a development environment 118 in which a developer 120 is able to develop and test programs using the obfuscated data 114. However, the original production data in the data source 102 can be kept secure by keeping it inaccessible to the developer 120. The development environment 118 is, in some implementations, a system for developing applications as dataflow graphs that include vertices (components or datasets) connected by directed links (representing flows of work elements) between the vertices. For example, such an environment is described in more detail in U.S. Publication No. 2007/0011668, entitled "Managing Parameters for Graph-Based Applications," incorporated herein by reference.

The data profiling module 106 can profile data from a variety of types of systems including different forms of database systems. The data may be organized as records having values for respective fields (also called "attributes" or "columns"), including possibly null values. The profile information can be organized to provide separate profiles for different fields, called "field profiles" describing values that occur in those fields. When first reading data from a data source, the data profiling module 106 typically starts with some initial format information about records in that data source. (Note that in some circumstances, even the record structure of the data source may not be known initially and may instead be determined after analysis of the data source). The initial information about records can include the number of bits that represent a distinct value, the order of fields within a record, and the type of value (e.g., string, signed/unsigned integer) represented by the bits. As the data profiling module 106 reads records from a data source, it computes statistics and other descriptive information that reflect the values in a given field (e.g., frequencies of particular values). The data profiling module 106 then stores those statistics and descriptive information in the form of field profiles for access by the data obfuscation module 112. The profile information can also include information associated with multiple fields of the records in the data source 102 such as total number of records, and total number of valid or invalid records. For example, one description of a process for profiling fields of a data source is described in U.S. Publication No. 2005/0114369, entitled "Data Profiling," incorporated herein by reference.

Figure 2:
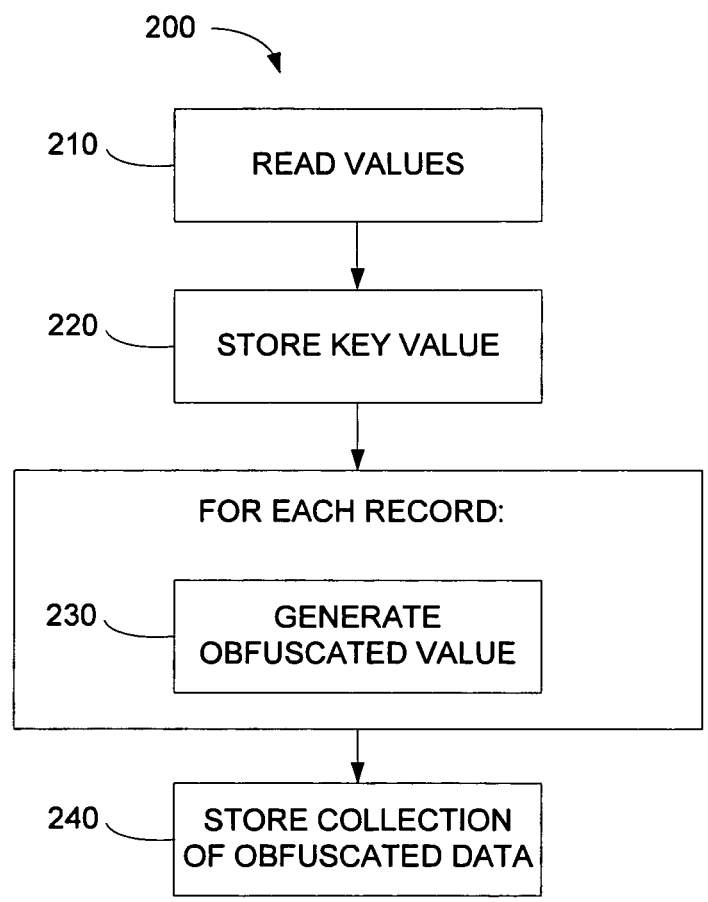
FIG. 2 is a flowchart of an exemplary data obfuscation procedure.

FIG. 2 shows a flowchart for an exemplary data obfuscation procedure 200. The procedure 200 includes reading (210) values occurring in one or more fields of multiple records from a data source. Optionally, profile information including statistics characterizing values of at least one of the fields is stored (e.g., a table with obfuscated values determined by ranges of index values that correspond to the statistics in the profile information, as described in more detail below). The procedure 200 includes storing (220) a key value that is used with cryptographic techniques to provide security to ensure the obfuscation cannot be easily reversed. For each of multiple of the records, the procedure 200 generates (230) an obfuscated value to replace an original value in a given field of the record using the key value such that the obfuscated value depends on the key value and is deterministically related to the original value. If stored profile information is used, the obfuscated value occurs in a collection of obfuscated data at a frequency determined based on the stored profile information. The procedure 200 includes storing (240) the collection of obfuscated data including records that include obfuscated values in a data storage system.

In some implementations, the data obfuscation procedure 200 is repeated each time a new data source is available, or new records are received into an existing source. The procedure can be invoked by a user, or automatically invoked at repeated intervals or in response to certain events.

In some approaches to obfuscation, the ability to obfuscate the actual production data may be enough; while in other approaches it may also be useful to have the ability to reverse the obfuscation process and match the obfuscated values back to the actual values. In some approaches, such as in the procedure 200 described above, it is useful to be able to ensure that the obfuscation process cannot be reversed to obtain the actual values, for example, using a stored secret key and cryptography techniques, as described in more detail below.

Consistent assignment of obfuscated values over time may be useful in some cases. For example, transaction data that includes records corresponding to different transactions each associated with a specific customer may need to match customer IDs obfuscated previously, such that all transactions with a given actual customer ID are assigned the same obfuscated customer ID. As another example, customers in a database from the same household may share the same address. It may be desirable to ensure that obfuscated data records for those customers have the same obfuscated address. If the obfuscated data needs to be read and understood by humans, it may be desirable to replace the actual value with a value selected from a predetermined set of recognizable values, rather than simply replacing those values with arbitrarily generated values. There are a variety of ways to ensure consistent assignment between a given value and a corresponding obfuscated value.

In one approach, the first time a given value is encountered, an obfuscated value is randomly chosen from a predetermined set and mapped to that given value. Both values are then stored in association with each other in a mapping data structure, for example. For all subsequent occurrences of a given value previously stored in the mapping data structure, the same corresponding obfuscated value is retrieved from the data structure.

In another approach, such as in the procedure 200 described above, a key is used to provide a deterministic mapping that appears random, without requiring a previously mapped actual and obfuscated values to be stored in a mapping data structure. Thus, this key-based approach can save storage space in some cases. For example, a key and a cryptographically strong hash function can be used to retrieve an obfuscated value from a predetermined set (e.g., a lookup table). Alternatively, a key and a pseudorandom-permutation algorithm can be used to compute an obfuscated value. In both cases, described in more detail below, the use of a key ensures that a given actual value always corresponds to the same obfuscated value, while making the correspondence appear random.

Figure 3:
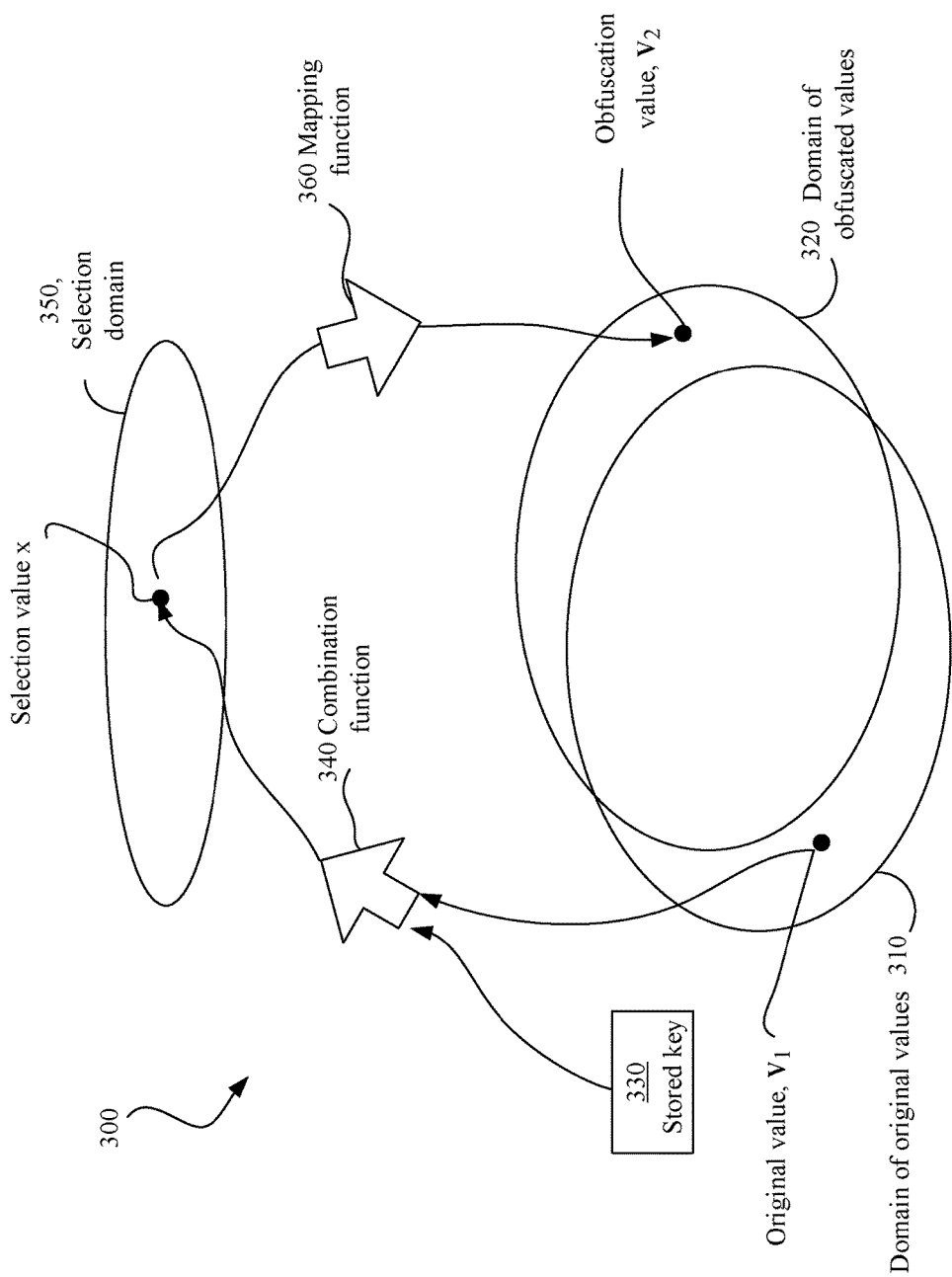
FIG. 3 is a schematic diagram of a deterministic mapping for a data obfuscation procedure.

FIG. 3 illustrates an example of a deterministic mapping 300 between a domain 310 of original values from an input dataset and a domain 320 of obfuscated values that are to replace those original values. A key k is stored in a key storage 330 and is consistently used for mapping all of the original values to respective obfuscated values in a given session of obfuscation in which referential integrity is to be preserved. A different key can be used in a different session of obfuscation that does not need to preserve referential integrity with the previous session.

An original value $v_1$ from the domain 310 and the key k are combined using a combination function 340 to yield selection value x from a selection domain 350. Any deterministic technique for combining the value $v_1$ and the key k can be used, such as a mathematical function or expression that takes the value $v_1$ and the key k as inputs. The combination function 340 is deterministic, such that the same values of $v_1$ and k always yield the same value of x.

The selection value x is then mapped to an obfuscated value $v_2$ from the domain 320 using a mapping function 360 (e.g., a deterministic mapping using a lookup table). The mapping function 360 is also deterministic, such that a given value of x always yields the same obfuscated value $v_2$. The domain 320 of obfuscated values may include some of the same values as the domain 310 of original values, but may also be not completely overlapping such that some of the values in the domain 310 are not included as possible obfuscated values in the domain 320 and some of the values in the domain 320 are not included in the domain 310. For example, it may be desirable for many of the original values to be possible obfuscated values (e.g. cities or states in address fields, or common names in name fields), but some specific sensitive information may be filtered out of the as possible obfuscated values (e.g., credit card numbers, social security numbers, or phone numbers). In some cases, it may be desirable to have obfuscated social security numbers that are valid (e.g., to support validity tests on the obfuscated data), and in some cases it may be desirable to have obfuscated social security numbers that are not valid (e.g., to ensure that the obfuscated data will not reveal anyone's personal information).

Either or both of the combination function 340 and the mapping function 360 can include cryptographic techniques to make it difficult to reverse the obfuscation process and recover an original value $v_1$ from a corresponding obfuscated value $v_2$. For the cryptographic hash function and the keyed pseudorandom permutation techniques described below, the combination function 340 incorporates the cryptographic techniques to yield a selection value x that is then used as an index into a table to select an obfuscated value $v_2$. However, in other implementations, the combination function 340 can be a non-cryptographic technique (e.g., a simple concatenation) to yield a selection value x, which is then used as an input to a cryptographic function such as a hash function to provide the obfuscated value $v_2$ or an index used to look up the obfuscated value $v_2$. Other deterministic mappings may produce an obfuscated value $v_2$ from a given original value $v_1$ directly without necessarily computing an intermediate selection value x.

In some implementations, the approach to obfuscating a particular value may depend on characteristics of that value. For example, data values appearing in a given field of an input dataset to be obfuscated may be categorized as having a "limited" or "unlimited" domain of values, and as having an "even" or "uneven" distribution of values. For key-based obfuscation, these characteristics can be used to determine whether obfuscated values are retrieved from a lookup table or computed by pseudorandom permutation. Even if a key is not used, these characteristics can also be used to determine whether the frequencies of specific values in the obfuscated data are made to reflect their frequencies in the actual production data.

For "limited-domain data," the number of possible values that could appear in a given field is limited to a finite number of values within a predetermined set of valid values (e.g., a number or string of a fixed length). During obfuscation of limited-domain data, validity checks can be used to determine whether an obfuscated value is within the predetermined set of valid values. "Unlimited-domain data" does not necessarily have a predetermined set of possible values (e.g., a value of arbitrary length). Examples of fields with limited-domain data include social security number (SSN), credit-card number (CCN), customer ID (Custid), U.S. phone number, and U.S. Zip code. Examples of fields with unlimited-domain data include first name, last name, and street address.

For "even-distribution data," different data values are assumed to be approximately equally likely, and are typically expected to be unique for each person represented in a database. For "uneven-distribution data," it is likely that different values will occur in a dataset with different frequencies, and may repeat in records of different people represented in a database. During obfuscation of uneven-distribution data, a "frequency lookup" function can be used to ensure that the frequencies of specific values in the obfuscated data match their frequencies in the actual production data, as described in more detail below. For the fields listed above, social security number, credit-card number, customer ID, and U.S. phone number are examples of fields with even-distribution data, which are expected to be unique to a given customer; and first name, last name, and U.S. Zip code are examples of fields with uneven-distribution data, which may repeat for different customers.

For unlimited-domain data, or for some uneven-distribution data, validity checking may not be possible or may not be able to be efficiently performed. In such cases, if plausible values cannot be computed, lookup tables can be used. For example, lookup tables of plausible names and addresses can be stored for obfuscating these fields. For uneven-distribution data, frequency lookup functions can be used to ensure that the obfuscated values are realistically distributed, or for even-distribution but unlimited-domain data the obfuscation process can ensure that the values are selected from the lookup table evenly.

Key-based obfuscation uses cryptographic techniques to construct functions whose results appear random but are in fact repeatable and predictable. A key is selected for obfuscating a given set of actual data. If the obfuscated data is ever compromised, the actual values cannot be recovered from the obfuscated data without the key, so the key should be kept private and stored in a secure manner. A given key can be stored for use in multiple executions of the obfuscation process to ensure that for any occurrences of a given actual value over multiple executions, the same obfuscated value is generated. A key-based obfuscation process can be executed in parallel on multiple datasets or multiple portions of a single dataset because key-based obfuscation does not necessarily require maintaining a mapping data structure of actual-to-obfuscated values used in the past. For example, the records in a dataset can be partitioned (e.g., based on a given field such as customer ID) into multiple sets of records, and the generation and replacement of obfuscated values can be performed in parallel on different sets of records using different computing resources (e.g., different processors or different computers). The specific technique for performing key-based obfuscation for a given field depends on the characteristics of the data values of that field:

For data with limited domain and even distribution, values are computed using a key and a pseudorandom-permutation algorithm. The same key is stored for use in multiple executions. Validity of the obfuscated values can be ensured using one or more validity functions.

For unlimited-domain data or uneven-distribution data, values are retrieved from a lookup table using a key and a cryptographic hash function. The same key and lookup tables are stored for use in multiple executions. Validity of the obfuscated values can be ensured by ensuring that the values in the lookup table are valid.

Figure 4:
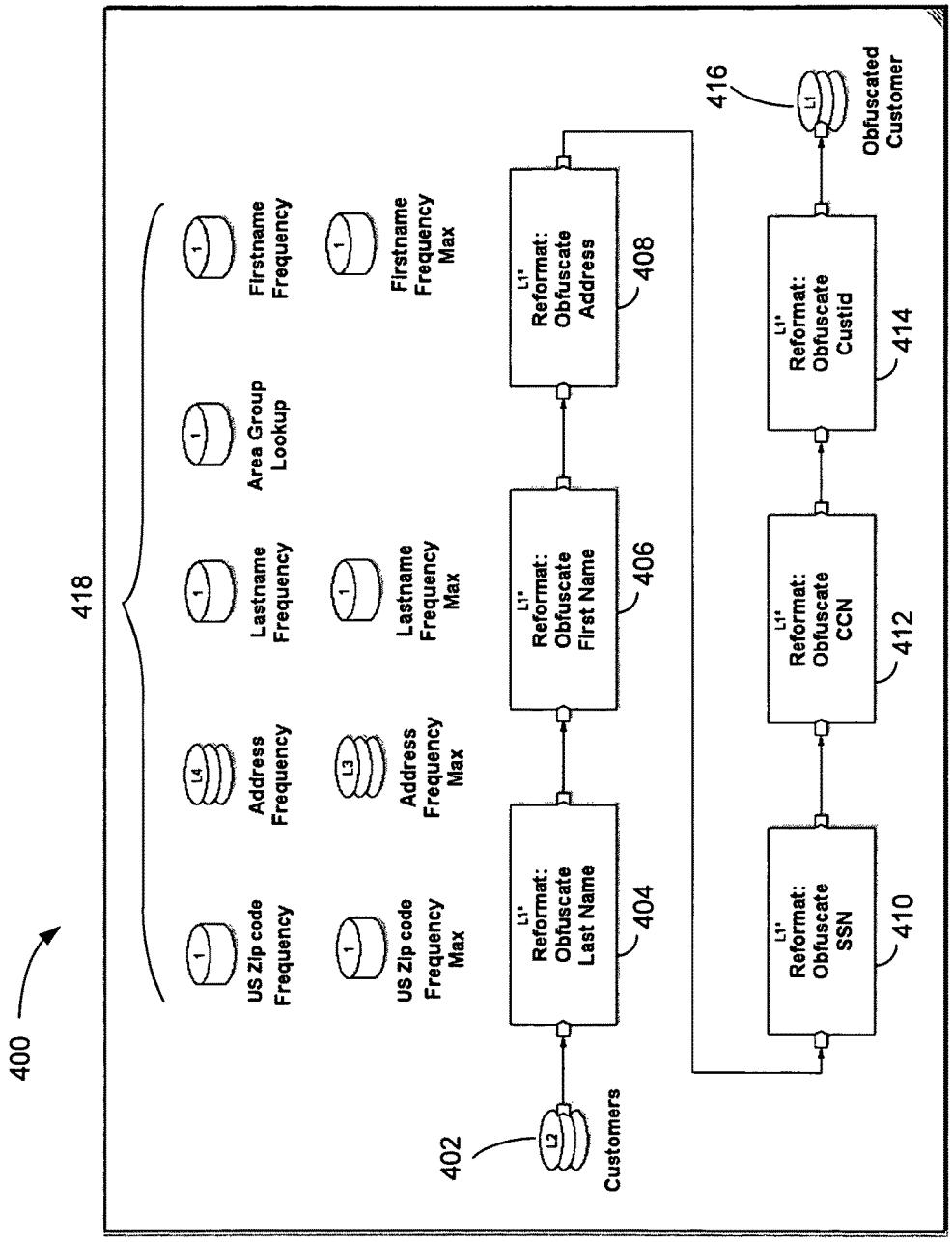
FIG. 4 is an exemplary dataflow graph for data obfuscation.

Referring to FIG. 4, an exemplary dataflow graph 400 performs an obfuscation process on a Customers dataset 402 provided as input. Records in the dataset 402 are read and provided to the components in the graph as a flow of records. By using a dataflow graph, to perform the obfuscation, the system 100 is able to combine the data obfuscation process with any of a variety of additional dataflow processing and is able to use parallel processing techniques for executing any of the components of the graph. The graph 400 includes a series of "Reformat" components that each reformats a given record received at its input port by replacing an actual value in a given field of the record with an obfuscated value and outputs the reformatted record at its output port. There is one Reformat component for each of multiple fields in the Customers dataset 402 that are to be obfuscated (e.g., all of the fields in the records, or a selected subset of the fields in the records). In this example, there are six fields that are to be obfuscated: Last Name, First Name, Address, SSN, CCN, and Custid. Component 404 handles obfuscation of the Last Name field, component 406 handles obfuscation of the Address field, component 408 handles obfuscation of the Address field, component 410 handles obfuscation of the SSN field, component 412 handles obfuscation of the CCN field, and component 414 handles obfuscation of the Custid field. The flow of obfuscated records output from the component 414 is stored as output of the graph 400 in an Obfuscated Customer dataset 416. The graph 400 is also associated with datasets 418 storing information characterizing certain properties of the input dataset 402, as described in more detail below. All of the Reformat components are able to use a common key value, which is stored as a parameter for the graph 400. The security of the obfuscated dataset 416 depends on keeping the key parameter secure. The key can be sufficiently long (e.g., a 12 or 60 digit number, or longer) to enhance the security.

Before or at the same time as the first record from the dataset 402 is processed in a component, the component determines whether to use a non-keyed technique, a keyed table lookup technique, or a keyed pseudorandom permutation technique for determining an obfuscated value for the field that is being handled by that component. If the field has values that do not need to be assigned consistently between different records associated with a given customer (e.g., a transaction amount) and that are not particularly sensitive, values in that field of the records can be obfuscated using a technique that does not rely on the stored key value. For example, the component can use a random value generation function. If the field has values that should be assigned consistently between different records associated with a given customer, and/or that should match a particular distribution, domain, or validity test, then the stored key can be used to perform either the keyed table lookup technique or the keyed pseudorandom permutation technique.

If the field has values that are unlimited-domain or uneven-distribution, the component uses the keyed table lookup technique, which is based on cryptographic hashing. A cryptographic hash function uses the stored key value to compute an index value, and that index value is used to lookup a value from a table of possible obfuscated values. Because cryptographic hashes yield values that appear random, the index (and therefore the obfuscated value) appears to be randomly chosen. However, the index is actually predictable and repeatable if the key value is known. If the field values have uneven distribution, the component uses a "frequency lookup" operation that uses frequency profile information for that field from one of the datasets 418.

For example, for fields such as First Name, Last Name, Address, and U.S. Zip code, the datasets 418 include a "Frequency" dataset and a "Frequency Max" dataset for each of these fields. The Frequency Max datasets include a total count of all values occurring in a given field of the actual data, and allow the frequency lookup operation to look up the total count for a given field. Thus, each Frequency Max dataset includes a signal total count value. Each Frequency dataset includes a lookup table indexed by non-overlapping ranges, and allow the frequency lookup operation to look up a given field value for a given index value using an "interval lookup" function. As different index values are selected the field values are selected at the appropriate frequency based on their frequencies of occurrence in the actual data.

Figure 5:
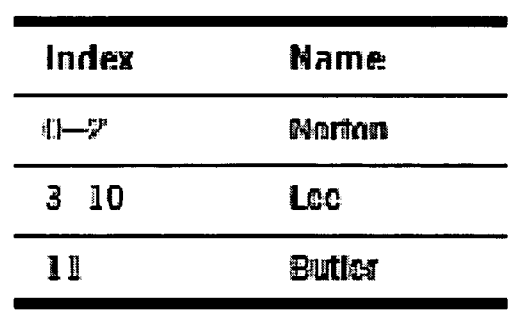

For example, FIG. 5 shows an example of a lookup table for a Frequency dataset for the First Name field. The name "Norton" is selected for an index value in the range of 0-2, the name "Lee" is selected for an index value in the range of 3-10, and the name "Butler" is selected for an index value of 11. The size of the range is proportional to the frequency at which the corresponding value appears in the actual data according to the statistics of the profile information. Thus, if the index values occur with equal probability, each of the Name values will occur at the same frequency in which it appears in the actual data.

If the field has values that are limited-domain and even-distribution, the component uses the keyed pseudorandom permutation technique, which is based on pseudorandom number generation (e.g., a Luby-Rackoff pseudorandom permutation generator). In some implementations, for any given key and for an input value in the range 1, . . . , N (e.g., a range of numbers corresponding to a limited domain for the original values such as social security numbers or credit card numbers), a permutation generator function f(k, n) is used to produce an obfuscated value that is related to an actual value in a way that appears random. For example, different values of n produce different values of f(k, n), where f(k, n) is an integer between 1 and N. The relationship between n and f(k, n) is deterministic, but appears random (e.g., consecutive values of n yield values of f(k,n) that appear randomly distributed). The value k is a key value that provides different sequences of n vs. f(k,n) for different values of k. For a given value of the key k, the resulting sequence of values of f(k, n) for consecutive values of n is determined; however, the sequence of values of f(k,n) for consecutive values of n for one value of k cannot be predicted just from the sequence of values of f(k,n) for consecutive values of n for another value of k.

The table shown in FIG. 6 illustrates an example in which the permutation generator can "shuffle" the possible values of f(k,n) between 1 and 20 for sequential values of n between 1 and 20 and a single key value k. One shuffled value of f(k,n) is mapped to each input value of n in this example. Because the combination of input value and key for each row is unique, no two shuffled values are the same. Since obfuscated values are selected according the shuffled values f(k,n), no two obfuscated values are the same either. The example given in FIG. 6 shows 20 shuffled values for simplicity, but much larger sequences can be generated.

The following examples describe implementations of each of the Reformat components in the dataflow graph of FIG. 4.

The component 404 that obfuscates values of the Last Name field can use a keyed_pick function to create a seemingly random index into an interval lookup table of last names. To ensure that different customers get different obfuscated last names even if their actual last names are the same, the Custid field can be used in computing the key value passed to keyed_pick. Doing this in combination with using an interval lookup can preserve the distribution statistics of the last names. In this example, family members with the same last names in the actual data may be assigned different last names in the obfuscated data.

The component 406 that obfuscates values of the First Name field can be implemented in a similar manner as component 404. The keyed_pick function is able to distinguish between male and female names if a field identifying customers as male or female is present in the actual data. Alternatively, the function can make a "good guess," for instance, by using additional lookup tables.

The component 408 that obfuscates values of the Address field uses the keyed_pick function to create seemingly random indexes into two interval lookup tables: one containing zip codes, cities, and states; and one containing house numbers and street names. The indexes may be predictable if the key is known. To make it more difficult to derive sensitive information, the component can choose the zip code and the street names independently, and may construct addresses that don't exist, such as 1600 Pennsylvania Avenue, Lexington, Mass. 02421. Alternatively, for applications in which addresses are to be validated, the component can be configured to choose the street names and zip code together. To ensure that house numbers are not unrealistically high for a given street, the component can set a limit on the possible values selected.

The component 410 that obfuscates values of the SSN field uses a pseudorandom permutation technique to choose pseudorandom 9-digit numbers until it finds one that corresponds to a valid SSN. The component 410 is also able to ensure that each obfuscated value is unique using a technique illustrated in FIG. 7. For simplicity, we assume that even numbers in FIG. 7 represent valid SSNs, while the odd numbers are 9-digit numbers that are not valid SSNs. As described above, the pseudorandom permutation technique can use a permutation generator function to "shuffle" the possible values for a given field. The first two columns of the table in FIG. 7 illustrate this shuffling, showing how the SSNs might be shuffled. The third column shows results of calling a function that verifies SSNs as many times as necessary to ensure that valid SSNs are output.

The arrows in the table show the sequence of steps:

a. For each input SSN (represented in Column 1), an encode_ssn function assigns a shuffled value in the same row of Column 2.

b. If the number chosen in Column 2 is even (valid), it may be written to a validated output variable (represented in Column 3) as the obfuscated value. If the number chosen in Column 2 is odd (invalid), the function goes back to Column 1, finds the chosen number there, and checks whether the value in that row of Column 2 is valid.

c. This procedure is repeated until a valid number is found. Because each number in Column 2 can be reached by only one number in Column 1 (that is, the mapping from Column 1 to Column 2 is one-to-one), each validated obfuscated value in Column 3 is unique. For example, for input fields containing 2 and 4, respectively, the component 410 would traverse the sequences shown at the top of the table in FIG. 7 to find valid output values. The first sequence is shown using arrows in the table of FIG. 7.

The component 412 that obfuscates values of the CCN field is based on validity criteria that the CCN is a 16-digit number and it starts with 4, although any other digit or sequence of digits could be used. The first 6 digits may be sufficient to determine the issuer. The last digit is a control number (e.g., computed using a Luhn algorithm) to check for errors in the digits preceding it. The component 412 uses the pseudorandom permutation technique to choose pseudorandom 15-digit numbers until it finds one that is valid, and then computes a control digit. The component 414 provides a validity check function to verify that a number is a valid CCN by checking the length and the control digit.

The component 414 that obfuscates values of the Custid field is based on the assumption that a Custid is a 10-digit number between 1000000000 and 9999999999. As with SSNs and CCNs, this component can define an encode function that uses the pseudorandom permutation technique to choose pseudorandom numbers. The obfuscation may differ from the approach used for SSNs and CCNs in that the validity checking may not be necessary.

After obfuscating data, to the data obfuscation module 112 is able to test the effectiveness of the obfuscation. In some implementations, the module 112 verifies that no actual data is present among the obfuscated values by performing a join operation using a key that may be a compound key composed of multiple field values (e.g., the value of the First Name field combined with the value of the Last Name field). By comparing the values in fields of the obfuscated records with values of corresponding fields in the actual records, the module 112 can verify that for any given first and last name, the obfuscated data contains a different value than the actual data.

The obfuscation techniques described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of computation graphs. The nodes and elements of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and predefined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described. It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A computer implemented method for obfuscating data in records of a data source, the method including:

storing, by one or more data processors, a key value for a set of records from a source of the set of records, the set of records being partitioned into multiple sets of records based on a given field of records in the set of records;

reading an original value in the given field of the record from a given one of the multiple sets of records, generating, by one or more data processors, an index value by applying the same stored key value and the read original value from that field to a deterministic mathematical function to produce the index value;

applying the index value to a lookup table of predetermined obfuscation values to retrieve from the lookup table an obfuscation value; and replacing the original value in that given field of the record with the obfuscation value to obfuscate the original value of that given field; and storing, by one or more data processors, the given one of the multiple sets of records having remaining original values in fields and obfuscation values in those given fields in a data storage system, as an obfuscated set of records.

2. The method of claim 1, wherein the one or more data processors are plural data processors further includes:

processing the multiple sets of records by the plural data processors according to a dataflow graph that provides reformat components that receive as input fields of the given record and the stored key value, and the original value in the given field of the record with the obfuscation value and outputs the reformatted record at its output port, and with the plural processors assigned to different ones of the sets of multiple records using parallel processing to execute the reformat components according to the dataflow graph.

3. The method of claim 1 wherein the deterministic mathematical function includes at least one of a cryptographic hash function that generates the index value, a non-cryptographic function that generates a selection value that is used as an input to a cryptographic hash function to provide the index value, a non-cryptographic function that generates a selection value that is used as an input to a cryptographic hash function to provide the index value or combining the original value and the same key using a cryptographic hash function to yield the index value.

4. The method of claim 2, wherein multiple index values within a range correspond to the same obfuscated value in the predetermined set of obfuscated values.

5. The method of claim 4, further including storing profile information including statistics characterizing values of at least one of the fields, wherein the size of the range is based on the statistics in the stored profile information characterizing values of the given field.

6. The method of claim 1, wherein the deterministic function produces an intermediate selection value that is used to provide the index value, and is a cryptographic hash function.

7. The method of claim 6, wherein the selection value is mapped to the obfuscated value using a deterministic mapping.

8. The method of claim 6, wherein a domain of values from which the obfuscated value is selected includes multiple of the original values in the given field of the records from the data source.

9. The method of claim 8, wherein one or more of the original values are not included in the domain of values.

10. The method of claim 9, wherein one or more of the values in the domain of values are not included in the original values.

11. The method of claim 1, wherein the cryptographic hash function prevents recovery of the original value from the obfuscated value using the key.

12. The method of claim 1, wherein the key is provided from different sequences of selection values.

13. The method of claim 12, wherein a first sequence of selection values for consecutive original values for a first value of the key is not predictable from a second sequence of selection values for consecutive original values for a second value of the key.

14. The method of claim 12, further includes:

determining whether the index value corresponds to a valid obfuscated value, and if not repeatedly combining the selection value and the key using a deterministic function to yield an additional selection value until the additional selection value corresponds to a valid obfuscated value.

15. The method of claim 14, wherein a valid obfuscated value consists of a predetermined number of digits.

16. The method of claim 1, wherein replacing the original values in the given field with the generated obfuscated values in records of different ones of the multiple sets of records occurs in parallel using different computing resources.

17. The method of claim 1, wherein at least a first record that includes an obfuscated value in the collection of obfuscated data includes at least one original value that was not replaced with an obfuscated value.

18. The method of claim 1, further including determining whether an original value in the first record is to be replaced with an obfuscated value using the key value based on whether the original value is to be replaced with the same obfuscated value consistently for multiple records in which the original value occurs.

19. A system for obfuscating data, the system including: a data storage system that stores records having values in one or more fields; and one or more processors coupled to the data storage system providing an execution environment to:

store a key value for a set of the records from the data storage system the set of records being partitioned into multiple sets of records based on a given field of records in the set of records;

the system is configured to:

read an original value in the given field of a given one of the multiple sets of records, generate an index value by applying the same stored key value and the read original value from that field to a deterministic mathematical function to produce the index value;

apply the index value to a lookup table of predetermined obfuscation values to retrieve from the lookup table an obfuscation value;

replace the original value in that field of the record with the obfuscation value to obfuscate the original value of that field; and store the given one of the multiple sets of records having remaining original values in fields and obfuscation values in those given fields in the data storage system as an obfuscated set of records.

20. A non-transitory computer-readable medium storing a computer program for obfuscating data, the computer program including instructions, when executed by a computer, causes the computer to:

store a key value for a set of records from a source of records the set of records being partitioned into multiple sets of records based on a given field of records in the set of records; and process each record of a given one of the multiple sets of records, and for each given field in the record, of the given one of the multiple sets of records, which record has a value being obfuscated, by instructions to:

read an original value in the given field of the given record, generate an index value by applying the same stored key value and the read original value from that given field to a deterministic mathematical function to produce the index value; apply the index value to a lookup table of predetermined obfuscation values to retrieve from the lookup table an obfuscation value;

replace the original value in that given field of the record with the obfuscation value to obfuscate the original value of that field; and store the given one of the multiple sets of records having remaining original values in fields and obfuscation values in those given fields in a data storage system, as an obfuscated set of records.

21. The method of claim 6, wherein the deterministic function always yields the same selection value for the same values of the original value and the key value.

22. The method of claim 1, wherein the stored key value is consistently used for replacing all of the original values that are being obfuscated, with respective obfuscated values in a given session of obfuscation of multiple sessions of obfuscation for storing different respective collections of obfuscated data.

23. The computer-readable medium of claim 20, wherein the obfuscated value occurs in the given field of the obfuscated data at a frequency determined based on statistics in the stored profile information characterizing values of the given field.

24. The computer-readable medium of claim 20, wherein the obfuscated value is generated by using the original value and the key as inputs to the function that generates the index value and using the index value to look up the obfuscated value.

25. The computer-readable medium of claim 24, wherein the predetermined set of obfuscated values is stored in the lookup table in which each obfuscated value corresponds to one or more index values.

26. The computer-readable medium of claim 24, wherein multiple index values within a range correspond to the same obfuscated value in the predetermined set of obfuscated values.

27. The computer-readable medium of claim 26, further including instructions to:

store profile information including statistics characterizing values of at least one of the fields, and the size of the range is based on the statistics in the stored profile information characterizing values of the given field.

28. The computer-readable medium of claim 20, wherein the deterministic function is a cryptographic hash function.

29. The computer-readable medium of claim 28, wherein the selection value is mapped to the obfuscated value using a deterministic mapping.

30. The computer-readable medium of claim 28, wherein a domain of values from which the obfuscated value is selected includes multiple of the original values in the given field of the records from the data source.

31. The computer-readable medium of claim 30, wherein one or more of the original values are not included in the domain of values.

32. The computer-readable medium of claim 31, wherein one or more of the values in the domain of values are not included in the original values.

33. The computer-readable medium of claim 20, wherein the deterministic function is a cryptographic hash function that prevents recovery of the original value from the obfuscated value using the key.

34. The computer-readable medium of claim 28, wherein the key is provided from different sequences of selection values.

35. The computer-readable medium of claim 34, wherein a first sequence of selection values for consecutive original values for a first value of the key is not predictable from a second sequence of selection values for consecutive original values for a second value of the key.

36. The computer-readable medium of claim 33, further includes instruction to:

determine whether the index value corresponds to a valid obfuscated value, and if not repeatedly combining the selection value and the key using a deterministic function to yield an additional selection value until the additional selection value corresponds to a valid obfuscated value.

37. The computer-readable medium of claim 36, wherein a valid obfuscated value includes a predetermined number of digits.

38. The computer-readable medium of claim 20 wherein the instructions to replace the original values in the given field with the generated obfuscated values in records of different ones of the multiple sets of records occurs in parallel using different computing resources.

39. The computer-readable medium of claim 20, wherein at least a first record that includes an obfuscated value in the collection of obfuscated data includes at least one original value that was not replaced with an obfuscated value.

40. The computer-readable medium of claim 20 wherein when an original value in the first record is to be replaced with an obfuscated value using the key value, is based on whether the original value is to be replaced with the same obfuscated value consistently for multiple records in which the original value occurs.

41. The system of claim 19 in which the obfuscated value is generated by using the original value and the key as inputs to the function that generates the index value and using the index value to look up the obfuscated value.

42. The system of claim 41, wherein the predetermined set of obfuscated values is stored in the lookup table in which each obfuscated value corresponds to one or more index values.

43. The system of claim 41, wherein multiple index values within a range correspond to the same obfuscated value in the predetermined set of obfuscated values.

44. The method of claim 1 in which the obfuscated value preserves characteristics of the original value.

45. The method of claim 44 in which the characteristics include at least one of record formats, ranges of possible values, statistical characteristics, and general profile.

46. The method of claim 44 in which the obfuscated values include credit-card numbers, and the obfuscated values include correctly calculated values for check digits of the credit-card numbers.

47. The method of claim 44 in which the original values have irregularities and the obfuscated values have the same or similar irregularities.

48. The method of claim 44 in which the obfuscated values includes at least one of names or addresses, and a frequency of specific values in the obfuscated values reflect their frequency in the original values.

49. The method of claim 44 in which the original values include at least one of social security numbers, credit-card numbers, customer IDs, phone numbers, zip codes, first names, last names, and street addresses, and the obfuscated values include social security numbers, credit-card numbers, customer IDs, phone numbers, zip codes, first names, last names, and street addresses, respectively.

50. The method of claim 49 in which the original values are in formats that can be read and understood by humans, and the obfuscated values are in the same formats that can be read and understood by humans.

51. The method of claim 1, further including storing profile information including statistics characterizing values of at least one of the fields, and wherein for the identified original value in the given field of the record, the corresponding obfuscated value is generated also using the stored profile information for the given field.

52. The method of claim 51, wherein the obfuscated value occurs in the given field of the collection of obfuscated data at a frequency determined based on statistics in the stored profile information characterizing values of the given field.

53. The system of claim 19, wherein the one or more processors further performs storing profile information including statistics characterizing values of at least one of the fields, and wherein for the identified original value in the given field of the record, the corresponding obfuscated value is generated also using the stored profile information for the given field.

54. The system of claim 53 in which the obfuscated value occurs in the given field of the collection of obfuscated data at a frequency determined based on statistics in the stored profile information characterizing values of the given field.

55. The non-transitory computer-readable medium of claim 20, wherein the instructions further causes the computer to store profile information including statistics characterizing values of at least one of the fields, and wherein for the identified original value in the given field of the record, the corresponding obfuscated value is generated also using the stored profile information for the given field.

56. The method of claim 1, further includes: partitioning, by one or more of the data processors, the set of records from the source of records into the multiple sets of records, with partitioning being based on the given field of the records in the dataset.

57. The system of claim 19, wherein the processors providing execution environment to: partition the set of records from the source of records into the multiple sets of records, with partitioning being based on the given field of the records in the dataset.

58. The non-transitory computer-readable medium of claim 20, wherein the instructions further causes the computer to:
partition the set of records from the source of records into the multiple sets of records, with partitioning being based on the given field of the records in the dataset.

59. The system of claim 19, wherein the one or more processors are plural processors and provide the execution environment to:
process the multiple sets of records by the plural data processors according to a dataflow graph that provides reformat components that receive as input, fields of the given record and the stored key value, and the original value in the given field of the record with the obfuscation value and outputs the reformatted record at its output port, and with the plural processors assigned to different ones of the sets of multiple records using parallel processing to execute the reformat components according to the dataflow graph.

60. The non-transitory computer-readable medium of claim 20, wherein the instructions further causes the computer to:
process the multiple sets of records by plural data processors according to a dataflow graph that provides reformat components that receive as input, fields of the given record and the stored key value, and the original value in the given field of the record with the obfuscation value and outputs the reformatted record at its output port, and with the plural processors assigned to different ones of the sets of multiple records using parallel processing to execute the reformat components according to the dataflow graph.

* * * * *

UNITED STATES PATENT AND TRADEMARK OFFICE
CERTIFICATE OF CORRECTION

PATENT NO. : 10,102,398 B2
APPLICATION NO. : 12/497354
DATED : October 16, 2018
INVENTOR(S) : Peter Neergaard It is certified that error appears in the above-identified patent and that said Letters Patent is hereby corrected as shown below:

In the Claims

Column 13, Line 21, Claim 2, after "input" insert --,--.

Column 14, Line 64, Claim 20, after "and" delete "for".

Signed and Sealed this
Fourteenth Day of May, 2019

Andrei Iancu
*Director of the United States Patent and Trademark Office*